US007996313B1

(12) United States Patent
McMurray et al.

(10) Patent No.: US 7,996,313 B1
(45) Date of Patent: Aug. 9, 2011

(54) METHOD FOR STRUCTURING A SUPPLEMENTAL INTEREST MORTGAGE

(75) Inventors: John P. McMurray, Woodland Hills, CA (US); Jacqueline Marie Doty, Olney, MD (US); Richard Peter Nespola, Jr., Washington, DC (US); Morgan C. Snyder, Clifton, VA (US); Lynne Sroka Mayo, Annandale, VA (US); Daniel Wayne Kelly, Reston, VA (US); Paul Alan Thomas, Ashburn, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 1106 days.

(21) Appl. No.: 10/788,207

(22) Filed: Feb. 27, 2004

Related U.S. Application Data

(60) Provisional application No. 60/450,664, filed on Mar. 3, 2003.

(51) Int. Cl.
*G06Q 40/00* (2006.01)
(52) U.S. Cl. ............... 705/43; 705/35; 705/36; 705/37; 705/38; 705/39; 705/44
(58) Field of Classification Search ............. 705/35–38, 705/44, 43
See application file for complete search history.

(56) References Cited

U.S. PATENT DOCUMENTS

| | | | | |
|---|---|---|---|---|
| 6,148,293 A * | 11/2000 | King | ............... | 705/35 |
| 6,671,677 B2 * | 12/2003 | May | ............... | 705/38 |
| 6,901,384 B2 * | 5/2005 | Lynch et al. | ............... | 705/38 |

OTHER PUBLICATIONS

Sinnock, Bonnie "Salomon back on top", National Mortgage News, New York; !pr 14, 1997. vol. 21, Iss. 28; p. 1, 2 pgs.*
"Securitizing Low-Income Multifamily Mortgages"; Stevenson, Eric. Mortgage Banking. Washington: May 1992. vol. 52, Iss. 8; p. 81, 6 pgs.*
Nachfrist (1985)—non-payment interest.*
"Low money down" Michelle C Hamecs, William S Renner. Housing Economics. Washington: Mar 1999. vol. 47, Iss. 3; p. 10, 4 pgs.*
Securitizing Low-Income Multifamily Mortgages Stevenson, Eric. Mortgage Banking. Washington: May 1992. vol. 52, Iss. 8; p. 81,6 pgs.*
Eatman et al. (Exhibit "Q" Contingent Interest Loans: Two Mortgages are Better Than One By: Louis P. Eatman and Alec G. Nedelman copyright 1990), pp. 78-82.

* cited by examiner

*Primary Examiner* — Harish T Dass
(74) *Attorney, Agent, or Firm* — Oblon, Spivak, McClelland, Maier & Neustadt, L.L.P.

(57) ABSTRACT

A system and method of structuring a supplemental interest mortgage is disclosed. A principal debt obligation and a supplemental debt obligation based on the principal debt loan are secured by a single security instrument. The principal debt obligation includes the principal loan and principal interest to compensate a lender for use of the lender's funds. The supplemental debt obligation includes supplemental interest to compensate a lender for the risk of borrower nonpayment.

18 Claims, 2 Drawing Sheets

| Month | Beginning Balance of Principal Loan | Principal and Interest | Interest | Principal | Ending Mortgage Balance | Supplemental Interest | Total of Payments: (Principal and Interest) plus (Supplemental Interest) |
|---|---|---|---|---|---|---|---|
| 1 | $200,000 | $1,264 | $1,083 | $181 | $199,819 | $130 | $1,394 |
| 2 | $199,819 | $1,264 | $1,082 | $182 | $199,637 | $130 | $1,394 |
| 3 | $199,637 | $1,264 | $1,081 | $183 | $199,455 | $130 | $1,394 |
| 4 | $199,455 | $1,264 | $1,080 | $184 | $199,271 | $130 | $1,394 |
| 5 | $199,271 | $1,264 | $1,079 | $185 | $199,086 | $130 | $1,394 |
| 6 | $199,086 | $1,264 | $1,078 | $186 | $198,900 | $129 | $1,394 |
| 7* $15,000 payment | $198,900 | $15,000 | $1,077 | $13,923 | $184,978 | $129 | $15,129 |
| 8 | $184,978 | $1,264 | $1,002 | $262 | $184,716 | $120 | $1,384 |
| 9 | $184,716 | $1,264 | $1,001 | $264 | $184,452 | $120 | $1,384 |
| 10 | $184,452 | $1,264 | $999 | $265 | $184,187 | $120 | $1,384 |
| 11 | $184,187 | $1,264 | $998 | $266 | $183,921 | $120 | $1,384 |
| 12 | $183,921 | $1,264 | $996 | $268 | $183,653 | $120 | $1,384 |
| 13 | $183,653 | $1,264 | $995 | $269 | $183,383 | $119 | $1,384 |
| 14 | $183,383 | $1,264 | $993 | $271 | $183,112 | $119 | $1,383 |
| 15 | $183,112 | $1,264 | $992 | $272 | $182,840 | $119 | $1,383 |
| 16 | $182,840 | $1,264 | $990 | $274 | $182,566 | $119 | $1,383 |
| 17 | $182,566 | $1,264 | $989 | $275 | $182,291 | $119 | $1,383 |
| 18 | $182,291 | $1,264 | $987 | $277 | $182,014 | $118 | $1,383 |
| 19 | $182,014 | $1,264 | $986 | $278 | $181,736 | $118 | $1,382 |
| 20 | $181,736 | $1,264 | $984 | $280 | $181,457 | $118 | $1,382 |
| 21 | $181,457 | $1,264 | $983 | $281 | $181,175 | $118 | $1,382 |
| 22 | $181,175 | $1,264 | $981 | $283 | $180,892 | $118 | $1,382 |
| 28 | $179,456 | $1,264 | $972 | $292 | $179,163 | $117 | $1,381 |
| 29 | $179,163 | $1,264 | $970 | $294 | $178,870 | $116 | $1,381 |

FIGURE 1

METHOD FOR STRUCTURING A SUPPLEMENTAL INTEREST MORTGAGE

This application claims priority from U.S. Provisional Application Ser. No. 60/450,664 filed Mar. 3, 2003. The entirety of that provisional application is incorporated herein by reference.

BACKGROUND OF THE INVENTION

1. Field of the Invention

The present invention generally relates to financial systems for processing financial information and for securing repayment of loans. More particularly, the present invention relates to systems and methods for structuring loans to be secured by mortgages on real estate.

2. Related Art

With home mortgage loans, in addition to requiring periodic repayment of the principal balance of a loan through installments, lenders also charge interest to compensate the lender for the use of the borrowed funds and for assuming the risk of nonpayment. Calculation of an interest rate is partly determined by the lender's cost to provide the funds for the loan. The interest rate is also determined by the lender's calculation of a variety of risks, such as the risk that interest rates will change during the term of the loan, or the risk that the borrower may cease payments on the debt.

Home mortgage lenders require that borrowers grant the lender a security interest in the borrower's home through a mortgage instrument. Consequently, one common measure of risk compares the principal loan balance to the value of the home that is secured under the mortgage. The higher the loan balance is in relation to the value, the greater the amount of risk. Lenders describe this as a loan-to-value (LTV) ratio. Where the loan amount is 80% of the value of the home, the borrower is considered to have an 80% LTV ratio. Current underwriting standards generally require loans with LTV ratios greater than 80% or higher than 80% to have additional risk protection through some form of additional security. Borrowers might provide such additional security by paying a higher interest rate, or through some other means, such as by obtaining mortgage insurance.

Borrowers may also be required to provide additional security where the borrower has a poor credit history, even though the LTV ratio may be as low as 70% and provide an adequate buffer of equity relative to the loan amount and the value of the home.

While other forms of providing lenders with additional security for repayment of a home loan exist, either where the LTV ratio exceeds a certain predetermined threshold value (e.g., 80%), or where the borrower has poor credit, mortgage insurance is the most common form of providing that additional security. A mortgage insurance policy protects the lender in the event of a payment default by the borrower by paying the lender some or all of the unpaid balance of the loan and costs of foreclosure upon completion of a foreclosure process under state law. Typically, the borrower pays for the mortgage insurance policy by paying a monthly mortgage insurance premium to the lender in addition to the regular home mortgage principal and interest payment. However, current U.S. tax laws do not permit a borrower to deduct mortgage insurance premiums paid and therefore borrowers may prefer an alternative means of providing additional security to the lender.

What is needed is a method for structuring a supplemental interest mortgage that offers borrowers an alternative home financing arrangement without borrower-paid mortgage insurance for loans that nevertheless represent a higher than generally acceptable risk, and provides borrowers with additional benefits, such as tax deductibility of the mortgage interest paid and early cancellation of the supplemental interest mortgage component, among other benefits.

SUMMARY OF THE INVENTION

The present invention meets the above-identified needs by providing a system and method for structuring a Supplemental Interest Mortgage ("SI Mortgage") that offers borrowers an alternative home financing arrangement for loans that represent a higher than generally acceptable risk. More specifically, the present invention is directed to systems and methods for structuring loans such that, in addition to the basic interest charged for the use of the lender's funds, the borrower is charged supplemental interest for the lender's risk of borrower nonpayment depending on the risk characteristics of the loan. The risk characteristics of the loan that could be used to determine whether to apply a supplemental interest mortgage could include, for instance, the LTV ratio or the borrower's credit history. Both the basic interest and supplemental interest are based on the unpaid principal loan balance. Repayment of both the basic interest and the supplemental interest are secured by the borrower's property. Under this novel and alternative financing arrangement, if the loan has high risk characteristics, the borrower would pay the lender a supplemental interest rate on the principal loan, in addition to interest paid on the principal loan amount, to compensate the lender for assuming increased risk. Because the supplemental interest mortgage component is separate from the principal loan, the parties may agree to cancel the supplemental interest mortgage component upon satisfaction of a particular condition or occurrence of an event, such as an increase in the LTV ratio, or an improvement in the borrower's handling of credit (demonstrated, for instance, by an improved credit score).

In an embodiment, the method and computer program product of the present invention for structuring a supplemental interest mortgage, includes the step of identifying a principal debt obligation comprising a principal loan and principal interest to compensate a lender for use of lender's funds. Next, the method and computer program product identifies a supplemental debt obligation based on the principal debt loan and comprising supplemental interest to compensate a lender for a risk of borrower nonpayment, wherein the principal debt obligation and the supplemental debt obligation are secured by a single security instrument.

Further features and advantages of the present invention as well as the structure and operation of various embodiments of the present invention are described in detail below with reference to the accompanying drawings.

DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 1 is a chart illustrating an interest calculation and payment calculation method according to an embodiment of the present invention.

DETAILED DESCRIPTION OF THE INVENTION

Figure 2:
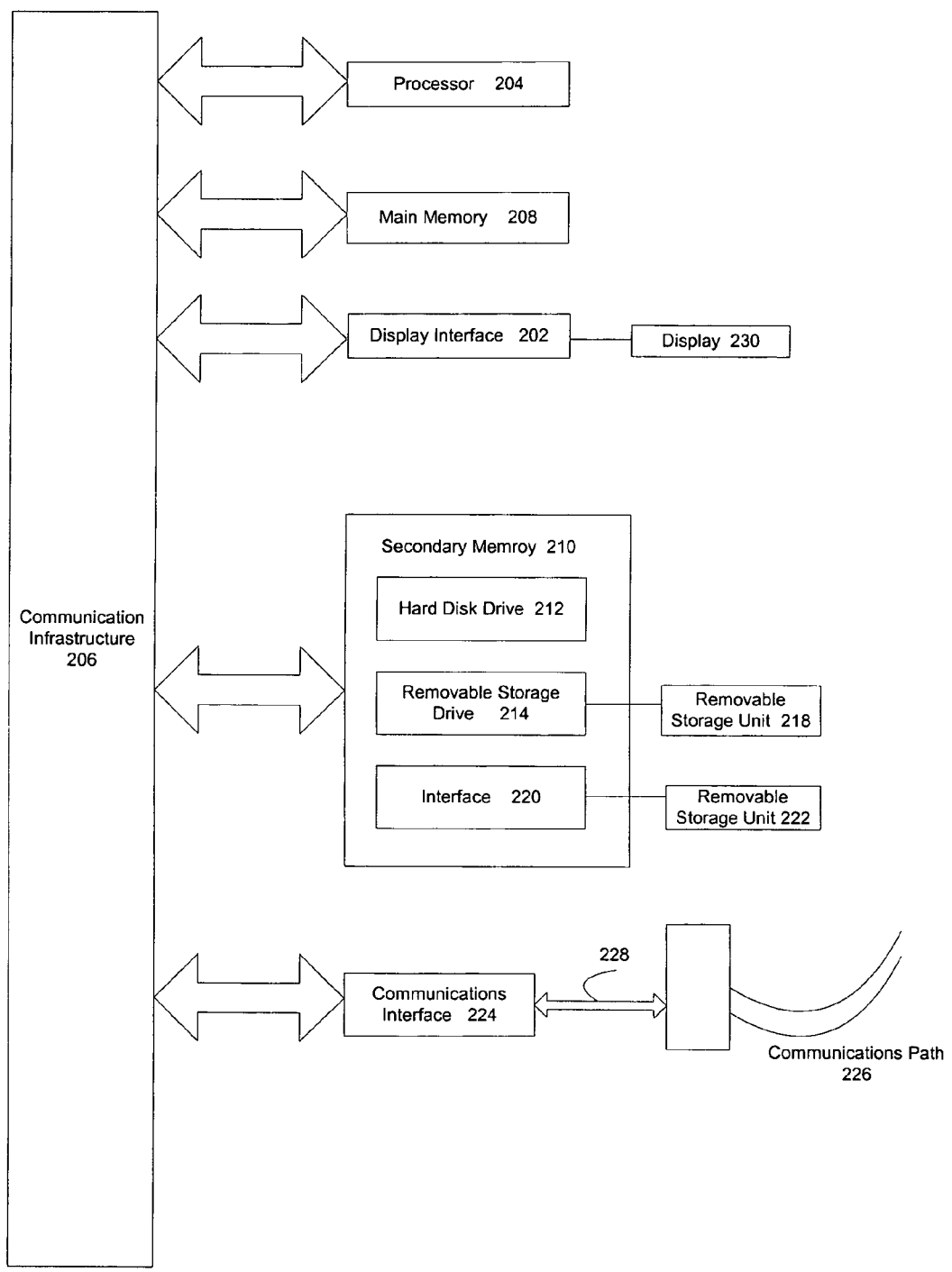
FIG. 2 is a block diagram of an exemplary computer system useful for implementing the present invention.

In an embodiment of the present invention, the principal debt obligation and the supplemental interest obligation are secured by a single security instrument, requiring all sums due under both loan obligations be paid. A default under one loan obligation is a default under the other loan obligation. Both the principal loan obligation and the supplemental interest obligation are serviced by the same loan servicer.

In an embodiment, the system and method used for an SI Mortgage would involve at least two separate debt obligations from a homeowner: the first debt obligation would be the principal loan (i.e., principal and interest) to the borrower for the funds required to purchase a home or, in the case of a mortgage refinance, to satisfy the borrower's existing mortgage. If the principal debt obligation has risk characteristics, such as an LTV ratio that is above 80%, there would be a supplemental debt obligation (e.g., interest only) that provides for supplemental interest to compensate the lender for the additional risk of default. The amount of supplemental interest paid under the SI Mortgage is determined by the risk characteristics associated with the principal loan and is calculated based on the declining balance of the principal debt obligation; there is no principal advanced under the supplemental debt obligation; it would have a zero loan balance. If the risk were a high LTV ratio, the SI Mortgage could be used in lieu of mortgage insurance. The SI Mortgage could be used, however, to protect against a variety of other lending risks. The supplemental interest debt obligation is based on the risk characteristics of the principal loan; consequently, the borrower's obligation to pay supplemental interest could terminate without affecting the borrower's obligation on the principal debt if the risk is no longer present.

There is currently no home loan financing arrangement available that has each of the characteristics of the SI Mortgage. For home loans with higher than 80% LTV ratios, there currently exist three financing arrangements: (1) borrower paid mortgage insurance, (2) lender paid mortgage insurance, and (3) secondary financing. However, none of these three mortgage products combines the potential for tax deductibility, the cancellation ability, and the flexibility of the SI Mortgage.

Conventional home mortgage lenders require borrowers to obtain mortgage insurance where the LTV ratio is greater than 80%. The mortgage insurance coverage protects these lenders in the event of a payment default by their borrowers. Borrowers pay the mortgage insurance premium in addition to their regular monthly home loan principal and interest payment. While the amount borrowers pay as interest to their lenders on the home loan are tax deductible under current U.S. tax laws, the premium paid for the mortgage insurance is not tax deductible. One advantage of mortgage insurance, however, is that under current federal law, mortgage insurance must be cancelled when the LTV ratio is reduced to 78%, and under certain other circumstances.

Lender-paid mortgage insurance is a variation on borrower-paid mortgage insurance where, as the name implies, the lender agrees to pay the premiums. There are some advantages and disadvantages for the borrower. On the one hand, because the lender charges the borrower a higher interest rate to cover its costs to pay the mortgage insurance premiums, it does permit the borrower to deduct from its income taxes the interest paid on the home loan. However, unlike borrower-paid mortgage insurance which must be cancelled when the LTV ratio is reduced to 78%, the additional interest payment continues until the loan is paid off.

Some borrowers avoid paying any mortgage insurance premiums by securing a conventional first home mortgage loan for 80% of the value of the home and securing it with a second home mortgage loan in the amount of funds needed to provide sufficient funds to purchase the home or refinance an existing loan. Lenders originating these first and second home mortgage loans as an alternative to mortgage insurance have found that the two mortgages in the aggregate are similar in their risk characteristics to a single home mortgage loan with an LTV ratio of 90% or higher (i.e., mortgages that would have mortgage insurance as a risk protection). However, because the borrower would not have obtained any mortgage insurance when the financing arrangement uses two home mortgage loans, the lender of the first home mortgage loan is exposed to the increased risk of default without any compensation for having assumed the increased risk. This two mortgage arrangement also results in additional processing and lien recordation costs associated with the second mortgage.

The SI Mortgage will better position home mortgage lenders to offer the marketplace a product that competes with first and second home mortgage loan financing programs. The SI Mortgage would also reduce the mortgage lender's risk exposure and would enable borrowers to take advantage of the benefits of a cancelable supplemental interest debt obligation along with the potential opportunity for tax deductibility.

Cancellation of the supplemental interest debt obligation could occur when the risk characteristics are no longer present, such as when the LTV ratio of the principal loan is reduced to 78%, or when the borrower's risk profile improves. Cancellation of the supplemental interest obligation could occur automatically, when certain pre-set conditions are met. Cancellation of the supplemental interest obligation could also occur at the borrower's request, when certain pre-set conditions are met. When the supplemental interest debt obligation is cancelled, the principal loan remains in place with all of its original terms and obligations. If not previously cancelled, the supplemental debt obligation would be cancelled once the primary debt obligation is paid in full. Because the terms of the principal loan would be predictable and will be consistent with other standard first mortgage loan products, the loans representing the principal loan could be combined with other loans having similar characteristics into mortgage loan pools. Securities dealers could then sell securities, known as mortgage-backed securities, that include, along with other comparable mortgage products, the principal loan. Because the terms of the principal loan are consistent with other first mortgage loans, they can be pooled into pools of mortgage-backed securities that can be sold to investors, thus providing new funds for continued mortgage financing. This brings liquidity and efficiency into the mortgage financing market and reduces borrowing costs to consumers.

Referring now to FIG. 1, a chart illustrating an interest calculation and payment calculation method according to an embodiment of the present invention is shown. The illustration of FIG. 1 assumes: a principal loan amount of $200,000.00; an annual interest rate on principal loan of 6.5%; a term of 30 years; and a supplemental interest rate of 0.78%. The chart of FIG. 1 illustrates how a principal curtailment on the principal loan would affect the amount of interest due on the second loan.

In month 7, the borrower made a curtailment, larger than the necessary principal payment of $15,000 against the first mortgage. This curtailment is done to illustrate to extent to which the payment on the SI Mortgage component would change based on the unpaid balance of the first mortgage and does not represent a typical borrower situation.

Example Implementations

The calculations of the present invention (or portion(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

In fact, in one embodiment, the invention is directed toward one or more computer systems capable of carrying out the functionality described herein. An example of a computer system 200 is shown in FIG. 2.

The computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230.

Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218 represents a floppy disk, magnetic tape, optical disk, etc., which is read by and written to by removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip, such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228 which may be electronic, electromagnetic, optical or other signals capable of being received by communications interface 224. These signals 228 are provided to communications interface 224 via a communications path (e.g., channel) 226. This channel 226 carries signals 228 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 214, a hard disk installed in hard disk drive 212, and signals 228. These computer program products provide software to computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212 or communications interface 224. The control logic (software), when executed by the processor 204, causes the processor 204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

The present invention is described in terms of the above embodiments. This is for convenience only and is not intended to limit the application of the present invention. In fact, after reading the description of the present invention, it will be apparent to one skilled in the relevant arts how to implement the present invention in alternative embodiments.

In addition, it should be understood that the Figures described above, which highlight the functionality and advantages of the present invention, are presented for example purposes only. The architecture of the present invention is sufficiently flexible and configurable, such that it may be utilized in ways other than those shown in the Figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer implemented method of structuring a supplemental interest mortgage, comprising:
   issuing a principal debt obligation to a borrower, wherein the principal debt obligation is issued over a communications network connected to a processor on which the principal debt obligation is calculated;

wherein the principal debt obligation comprises (i) a principal loan based on a principal debt amount; and (ii) a principal interest to compensate a lender for the borrower's use of the principal debt amount; and issuing a supplemental debt obligation to the borrower based on the principal debt amount, wherein the supplemental debt obligation is issued over a communications network connected to the processor on which the supplemental debt obligation is calculated;

wherein the supplemental debt obligation comprises a supplemental interest based on the principal debt amount to compensate the lender for a risk of nonpayment by the borrower;

wherein the supplemental debt obligation is determined by at least one risk characteristic including at least one of a loan-to-value (LTV) ratio that exceeds a predetermined threshold value, a credit score that is below a predetermined threshold value and a Fair Isaac Credit Organization (FICO) credit score that is below a predetermined threshold value;

wherein the principal debt obligation and the supplemental debt obligation are secured by a single security instrument: and wherein the supplemental interest mortgage is structured without borrower-paid mortgage insurance.

2. The method of claim 1, wherein the supplemental interest mortgage is utilized to purchase a house.

3. The method of claim 1, wherein the principal debt obligation satisfies a borrower's existing mortgage.

4. The method of claim 1, further comprising canceling the supplemental debt obligation when at least one risk characteristic is reduced to at least one predetermined condition.

5. The method of claim 4, wherein the at least one risk characteristic is a loan-to-value (LTV) ratio that is reduced to a predetermined ratio.

6. The method of claim 4, wherein the at least one risk characteristic is a credit score that is below a predetermined threshold value.

7. The method of claim 6, wherein the credit score is a Fair Isaac Credit Organization (FICO) credit score.

8. The method of claim 7, further comprising combining the principal debt obligation with other loans having similar characteristics into a mortgage loan pool.

9. The method of claim 8, wherein the mortgage loan pool is included in a mortgage-backed security.

10. The method of claim 1, further comprising:

canceling the supplemental debt obligation based on payment of a portion of the principal debt amount.

11. The method of claim 1, wherein the principal debt obligation and the supplemental debt obligation are issued by the same lender.

12. The method of claim 1, wherein the supplemental debt obligation is interest only.

13. A computer program product comprising a computer usable medium having control logic stored therein for causing a computer to perform calculations for a supplemental interest mortgage, said control logic comprising:

first computer readable program code means for causing the computer to issue a principal debt obligation to a borrower; wherein the principal debt obligation comprises (i) a principal loan based on a principal debt amount and (ii) a principal interest to compensate a lender for the borrower's use of the principal debt amount, wherein the principal debt obligation is issued over a communications network connected to a processor on which the principal debt obligation is calculated; and second computer readable program code means for causing the computer to issue a supplemental debt obligation to the borrower based on the principal debt amount, wherein the supplemental debt obligation is issued over a communications network connected to the processor on which the supplemental debt obligation is calculated; and wherein the supplemental debt obligation comprises a supplemental interest based on the principal debt amount to compensate the lender for a risk of nonpayment by the borrower;

third computer readable program code means for causing the computer to determine the supplemental debt obligation by using at least one risk characteristic including at least one of a loan-to-value (LTV) ratio that exceeds a predetermined threshold value, a credit score that is below a predetermined threshold value and a Fair Isaac Credit Organization (FICO) credit score that is below a predetermined threshold value;

wherein the supplemental interest mortgage is structured without borrower-paid mortgage insurance.

14. The computer program product of claim 13, further comprising fourth computer readable program code means for causing the computer to cancel the supplemental debt obligation when a condition relating to a lender's risk exposure is met.

15. A computer implemented method of structuring a supplemental interest mortgage, comprising:

issuing a principal debt obligation to a borrower, wherein the principal debt obligation is issued over a communications network connected to a processor on which the principal debt obligation is calculated;

wherein the principal debt obligation comprises (i) a principal loan based on a principal debt amount; and (ii) a principal interest to compensate a lender for the borrower's use of the principal debt amount; and issuing a supplemental debt obligation to the borrower based on the principal debt amount, wherein the supplemental debt obligation is issued over a communications network connected to the processor on which the supplemental debt obligation is calculated;

wherein the supplemental debt obligation comprises a supplemental interest based on the principal debt amount to compensate the lender for a risk of nonpayment by the borrower;

wherein the principal debt obligation and the supplemental debt obligation are secured by a single security instrument;

wherein the supplemental debt obligation is determined by at least one risk characteristic including at least one of a loan-to-value (LTV) ratio that exceeds a predetermined threshold value, a credit score that is below a predetermined threshold value and a Fair Isaac Credit Organization (FICO) credit score that is below a predetermined threshold value;

wherein the borrower pays the principal interest and the supplemental interest in periodic payments; and wherein the supplemental interest mortgage is structured without borrower-paid mortgage insurance.

16. The method of claim 15, wherein the periodic payments comprising the supplemental interest and the principal interest are paid concurrently by the borrower.

17. A computer program product comprising a computer usable medium having control logic stored therein for causing a computer to perform calculations for a supplemental interest mortgage, said control logic comprising:
  first computer readable program code means for causing the computer to issue a principal debt obligation to a borrower; wherein the principal debt obligation comprises (i) a principal loan based on a principal debt amount and (ii) a principal interest to compensate a lender for the borrower's use of the principal debt amount, wherein the principal debt obligation is issued over a communications network connected to a processor on which the principal debt obligation is calculated; and
  second computer readable program code means for causing the computer to issue a supplemental debt obligation to the borrower based on the principal debt amount, wherein the supplemental debt obligation is issued over a communications network connected to the processor on which the supplemental debt obligation is calculated;
  third computer readable program code means for causing the computer to determine the supplemental debt obligation by using at least one risk characteristic including at least one of a loan-to-value (LTV) ratio that exceeds a predetermined threshold value, a credit score that is below a predetermined threshold value and a Fair Isaac Credit Organization (FICO) credit score that is below a predetermined threshold value;
  wherein the supplemental debt obligation comprises a supplemental interest based on the principal debt amount to compensate the lender for a risk of nonpayment by the borrower; and
  wherein the principal debt obligation and the supplemental debt obligation are secured by a single security instrument, and
  wherein the borrower pays the principal interest and the supplemental interest in periodic payments; and
  wherein the supplemental interest mortgage is structured without borrower-paid mortgage insurance.

18. The computer program product of claim 17, wherein the periodic payments comprising the supplemental interest and the principal interest are paid concurrently by the borrower.

\* \* \* \* \*